S. OPONIAK AND A. H. RAINFTLEN.
COUPLING HOOK.
APPLICATION FILED JAN. 11, 1921.
1,375,724.
Patented Apr. 26, 1921.
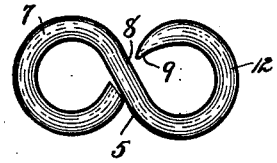
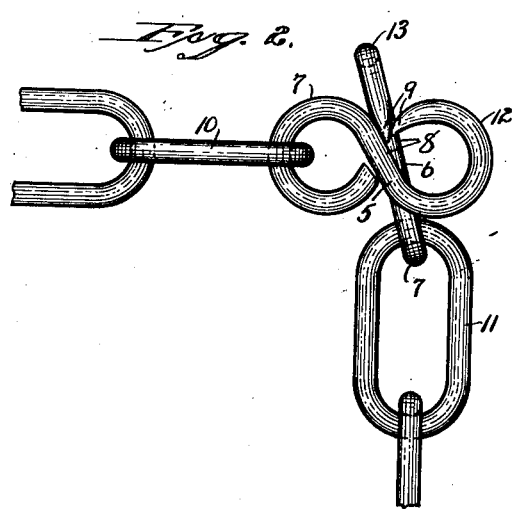
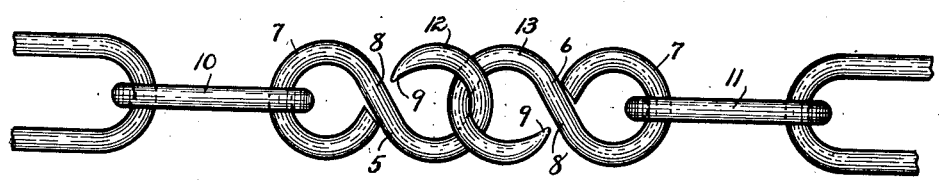

UNITED STATES PATENT OFFICE.

STANLEY OPONIAK AND AUGUST H. RAINFTLEN, OF PLANTSVILLE, CONNECTICUT.

COUPLING-HOOK.

1,375,724.  Specification of Letters Patent.  Patented Apr. 26, 1921.

Application filed January 11, 1921. Serial No. 436,407.

*To all whom it may concern:*

Be it known that we, STANLEY OPONIAK and AUGUST H. RAINFTLEN, citizens of Poland and Germany, respectively, residing at Plantsville, in the county of Hartford and State of Connecticut, have invented a new and useful Improvement in Coupling-Hooks; and we do hereby declare the following, when taken in connection with the accompanying drawings and the characters of reference marked thereon, to be a full, clear, and exact description of the same, and which said drawings constitute part of this application, and represent, in—

Figure 1 a side view of a coupling hook constructed in accordance with our invention.

Fig. 2 a side view of two coupling hooks shown in position of engagement or disengagement.

Fig. 3 a side view showing two coupling hooks engaged.

This invention relates to an improvement in coupling hooks such as are commonly employed for connecting two ends of a chain. A common method of connecting the ends of chains is by means of S hooks, but where it is desirable to uncouple the chain one end of the hook must be opened, and if so, the hook is liable to become accidentally disengaged.

The object of this invention is to employ two coupling hooks which may be readily engaged or disengaged, and which, when engaged, are not liable to become accidentally disengaged, and the invention consists in a construction as hereinafter described and particularly recited in the claim.

In carrying out our invention the two coupling members 5 and 6 are both of the same shape and form and both are formed like S hooks, one end coiled to form an eye 7, the end of which abuts against the medial portion 8. The other end 9 is pointed and is brought to a position slightly separated from the medial portion 8 and a point substantially opposite the end of the eye 7. The two hooks thus formed are connected with links 10 and 11 of a chain or other device which it is desired to couple, the eyes 7 being permanently engaged with the links 10 and 11. If, now, the points 9 of the hooks are brought together, as indicated in Fig. 2 of the drawings, the points of the hooks will pass, so that the hooks 12 and 13 will become engaged, the distance between the points 9 of the hooks and the medial portions 8 being less than the diameter of the wire from which the hooks are formed and so that when engaged, they are interlocked and cannot be disengaged until they are again brought to a position with the points 9 together, and when in use this position is not liable to occur. We thus provide coupling hooks which may be readily engaged or disengaged, but not liable to become accidentally disengaged.

We claim:

Two coupling S hooks, both of the same shape and form and both formed from wire, and each comprising a medial portion with an eye at one end and a hook at the other end, the ends of the hooks being taper-pointed, and the points separated from the medial portion to an extent less than the diameter of the wire from which the devices are formed, so that, when the points are brought together at the proper angle, the points will pass, whereby the two hooks may be engaged or disengaged.

In testimony whereof, we have signed this specification in the presence of two subscribing witnesses.

STANLEY OPONIAK.
AUGUST H. RAINFTLEN.

Witnesses:
PAULINE B. CUMMINGS,
EARLE R. CUMMINGS.